(12) United States Patent  
Flint (10) Patent No.: US 9,069,452 B2
(45) Date of Patent: Jun. 30, 2015

(54) MORPHING A USER-INTERFACE CONTROL OBJECT

(75) Inventor: Gary Flint, San Jose, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 12/958,176

(22) Filed: Dec. 1, 2010

(65) Prior Publication Data

US 2012/0144330 A1 Jun. 7, 2012

(51) Int. Cl.
*G06F 3/048* (2013.01)
*G06F 3/0484* (2013.01)

(52) U.S. Cl.
CPC .................................. *G06F 3/04847* (2013.01)

(58) Field of Classification Search
None
See application file for complete search history.

(56) References Cited

U.S. PATENT DOCUMENTS

| | | |
|---|---|---|
| 5,450,540 A | 9/1995 | Spohrer et al. |
| 5,483,261 A | 1/1996 | Yasutake |
| 5,488,204 A | 1/1996 | Mead et al. |
| 5,559,301 A | 9/1996 | Bryan et al. |
| 5,627,951 A | 5/1997 | Chaplin et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,080,324 B1 | 7/2006 | Nelson et al. |
| 7,184,064 B2 | 2/2007 | Zimmerman et al. |
| 7,421,656 B2 | 9/2008 | Fong et al. |
| 7,446,751 B2 | 11/2008 | Yamamoto |
| 7,562,302 B1 | 7/2009 | Barrus et al. |
| 7,663,607 B2 | 2/2010 | Hotelling et al. |
| 7,742,606 B2 | 6/2010 | Kreifeldt et al. |

(Continued)

FOREIGN PATENT DOCUMENTS

| | | |
|---|---|---|
| CN | 101425307 A | 5/2009 |
| JP | 2000-163031 A | 6/2000 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — William Bashore
*Assistant Examiner* — Hien Duong
(74) *Attorney, Agent, or Firm* — Morrison & Foerster LLP (57) ABSTRACT

Systems and techniques are disclosed for morphing a first control object in a user-interface into a second control object. According to some implementations, the first control object is provided for display on a graphical user interface presented on a display of a device. The first control object can be configured to control a parameter of a presentation of media content in response to a first input. An interaction input is received indicating a user interaction with the first control object. In response to the interaction input, the first control object can be morphed into a second control object, replacing the first control object. A second input can be received, the second input indicating an intention of the user to change a value of the second control object. And, the value of the second control object can be adjusted according to the second input.

25 Claims, 8 Drawing Sheets

(56) References Cited

U.S. PATENT DOCUMENTS

| | | | |
|---|---|---|---|
| 8,085,269 | B1 | 12/2011 | Classen |
| 8,098,235 | B2 | 1/2012 | Heubel et al. |
| 8,188,972 | B1 | 5/2012 | Krenz et al. |
| 8,479,122 | B2 | 7/2013 | Hotelling et al. |
| 8,875,054 | B2 | 10/2014 | Hopkins et al. |
| 2002/0063740 | A1 | 5/2002 | Forlenza et al. |
| 2003/0112262 | A1 | 6/2003 | Adatia et al. |
| 2005/0229105 | A1* | 10/2005 | Novak et al. ............ 715/744 |
| 2005/0262451 | A1 | 11/2005 | Remignanti et al. |
| 2006/0026521 | A1 | 2/2006 | Hotelling et al. |
| 2006/0120624 | A1* | 6/2006 | Jojic et al. ............... 382/284 |
| 2006/0197753 | A1 | 9/2006 | Hotelling |
| 2007/0106939 | A1 | 5/2007 | Qassoudi |
| 2007/0159497 | A1 | 7/2007 | Gur et al. |
| 2008/0072166 | A1* | 3/2008 | Reddy ...................... 715/764 |
| 2008/0126937 | A1 | 5/2008 | Pachet |
| 2008/0184139 | A1* | 7/2008 | Stewart et al. ........... 715/762 |
| 2008/0190266 | A1* | 8/2008 | Kim et al. ................. 84/602 |
| 2008/0288867 | A1* | 11/2008 | Jeong et al. .............. 715/716 |
| 2010/0058253 | A1* | 3/2010 | Son .......................... 715/863 |
| 2010/0146393 | A1* | 6/2010 | Land et al. ............... 715/723 |
| 2010/0159892 | A1* | 6/2010 | Dunnam et al. .......... 455/413 |
| 2010/0303450 | A1* | 12/2010 | Davies ...................... 386/349 |
| 2011/0202430 | A1* | 8/2011 | Narayanan et al. ....... 705/27.1 |

FOREIGN PATENT DOCUMENTS

| | | |
|---|---|---|
| JP | 2002-342033 A | 11/2002 |
| WO | WO2010088607 A1 | 8/2010 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Appino, P. (Nov. 1, 1990). "Hybrid Dial/Slider Icon," IBM Technical Disclosure Bulletin 33(6A):198-199, three pages.

Non-Final Office Action mailed Jun. 22, 2012, for U.S. Appl. No. 12/848,078, filed Jul. 30, 2010, 17 pages.

Non-Final Office Action mailed Aug. 2, 2013, for U.S. Appl. No. 12/848,078, filed Jul. 30, 2010, 20 pages.

Notice of Allowance mailed Jun. 26, 2014, for U.S. Appl. No. 12/848,078, filed Jul. 30, 2010, 15 pages.

* cited by examiner

MORPHING A USER-INTERFACE CONTROL OBJECT

TECHNICAL FIELD

This disclosure relates generally to computer generated graphical user interfaces.

BACKGROUND

Modern computer operating systems often provide a desktop graphical user interface ("GUI") for displaying various graphical objects. Some examples of graphical objects include windows, taskbars, docks, menus and various icons for representing documents, folders and applications. A user can interact with the desktop using a mouse, trackball, track pad or other known pointing device. If the GUI is touch sensitive then a stylus or one or more fingers can be used to interact with the desktop.

Some computer applications include knobs, sliders and other controls that can be manipulated by a user through a pointing device or by touch input. For example, graphical objects emulating knobs and sliders of a mixing board or other hardware device can be included in the GUI of an audio or video application. The user can use a mouse or finger to rotate the knob control or move the slider control as desired to control a parameter of the application.

SUMMARY

Systems and techniques are disclosed for morphing a first control object in a user-interface into a second control object replacing, at least temporarily, the first control object. The first control object can be configured to control a first parameter of a presentation of media content, such as play/pause, in response to a first input, such as a press-and-release. The second control object can be configured to control another parameter of the presentation, such as playback rate, using a second input. When a user interacts with the first control object with an interaction input, such as with a press-and-hold or with a mouse-over, the first control object morphs into the second control object. The user can use the second control object to control the media presentation using the second input, such as input (e.g. movement) along a dimension of the second control object. In some implementations, when the user terminates the second input such as by terminating input along the dimension, the second control object can return to a neutral or default value. Also, in some implementations, when the user terminates the second input, such as terminating the input along the dimension, the second control object can automatically morph back into the first control object. To control the media presentation again using the second control object, the user interacts again with the first control object to morph the first control object into the second control object.

In some aspects, a user can press-and-hold a play/pause button with a pointer or with a touch input, which initiates a morphing of the play pause button into a slider control including a slide rail with a slider. While the user continues to press-and-hold, the user can move the pointer along the slide rail. In some implementations, the slide rail can have a neutral position (e.g., at center), and a right end and left end. The slider moves, tracking the pointer as the pointer moves along the slide rail. In some examples, the slider control can be a shuttle control, jog control, or both (i.e. a jog shuttle control) for controlling a playback rate of a media presentation. At the neutral position of the slide rail, the playback rate can be zero (0×) and no playing takes place. In some examples, the play- back rate can be one (1×) at the neutral position and the presentation plays at a normal rate. As the slider moves along the slide rail towards the right end or towards the left end of the slide rail (as seen from the user's perspective), the presentation can fast-forward or rewind respectively, at a rate dictated by the position of the slider on the slide rail. The closer the slider is to the right end of the slider rail, the faster the rate of fast forward. And, the closer to the left end of the slide rail, the faster the rewind.

In some examples, when the user releases the press-and-hold, the slider snaps back to the neutral position of the slide rail. And, the user adjust a playback rate again by pressing-and-holding a location on the slide rail. To lock the slider into place, another input can be received such as a swipe up or down the user interface (e.g., a vertical swipe). When the slider is locked into place on the slide rail, a value dictated by a location of the slider also locks, such that the press-and-hold can be released without also changing the value indicated by the location.

In some examples, when the user releases the press-and-hold, the normal playback rate resumes and the slider morphs back into a play/pause button. An input, such as swiping the pointer down while continuing to press-and-hold, can lock the slider control on the user-interface such that when the press-and-hold is released, the slide rail and slider remain displayed in the user interface.

In some aspects, a computer-implemented method includes causing a first control object to be displayed on a graphical user interface presented on a display of a device, the first control object configured to control a parameter of a presentation of media content in response to a first input; receiving an interaction input indicating a user interaction with the first control object; and in response to the interaction input, morphing the first control object into a second control object, replacing the first control object.

One or more of the following features can optionally be included. The interaction input can include a press-and-hold. The morphing can include morphing the first control object into the second control object, replacing a third control object in addition to replacing the first control object.

The method can also include receiving a second input, the second input indicating an intention of the user to change a value of the second control object; and adjusting the value of the second control object according to the second input. The value of the second control object can include a rate of playback of the presentation; wherein the second control object includes a slider and a slide rail for adjusting the value of the second control object; and wherein the value of the second control object can be determined by a location of the slider along a dimension of the slide rail. The first control object can be a toggle button for toggling between play and pause. The second input can include a type different from the first input. The method can also include morphing the second control object back into the first control object in response to receiving a third input. And, the receiving the third input can include receiving a termination of the second input. Also, the adjusting the value of the second control object to a default value in response to receiving a third input. The third input can include receiving a termination of the second input. The interaction input can include a type different from the first input.

Other embodiments of these aspects include corresponding systems, apparatus, and computer programs, configured to perform the actions of the methods, encoded on computer storage devices.

In some aspects, a computer implemented method includes causing a first control object to be displayed on a graphical user interface presented on a display of a device, the first control object for providing control of a first parameter of a presentation of media content; receiving an interaction input indicating a user interaction with the first control object; and while the interaction input is being received: morphing the first control object into a second control object in response to the interaction input, the second control object replacing the first control object and the second control object for providing control of a second parameter, the second parameter different from the first parameter.

One or more of the following features can optionally be included. The method can include, while the interaction input is being received, receiving a second input manipulating the second control object to select a value of the second parameter; and adjusting the presentation according to the selected value of the second parameter. The second control object can be a jog shuttle control for controlling a rate of playback; and wherein receiving the second input includes receiving input associated with the jog shuttle control.

The morphing includes providing for display an animation of the first control object changing into the second control object. The method can includes receiving a termination of the interaction input, and adjusting a value of the second parameter to a default value in response to receiving the termination. The method can also include morphing the second control object back into the first control object in response to receiving a termination of the interaction input. The interaction input can include a press-and-hold in a location associated with the first control object. The interaction input can include a hover-over with a pointer of a location associated with the first control object.

A value of the second parameter can be configured to change to a default value in response to a termination of the interaction input; and the method can further include: receiving a third-input while the interaction input is being received, and locking the value of the second control object in response to the third input such that upon termination of the interaction input, the value of the second control object remains substantially unchanged. And, the method can include providing a visual cue indicating the locking of the value of the second control object.

Other embodiments of these aspects include corresponding systems, apparatus, and computer programs, configured to perform the actions of the methods, encoded on computer storage devices.

In various embodiments, morphing a first control object into a second control object allows for multiple types of controls to be provided in limited space within a user interface without unduly obstructing media content being presented in the user-interface. Also, in some embodiments, morphing a first control object into a second control object allows a user to quickly access different control functionalities without having to navigate through multiple layers of menus. Also, morphing provides a visual cue to the user indicating that a particular type of input can be used to control a particular parameter of a presentation. And, in various embodiments, providing a slide rail with a slider to adjust the rate at which a media presentation is played forward and backward, allows a user to locate accurately a position in a presentation.

The details of one or more implementations of a control object morphing into another control object are set forth in the accompanying drawings and the description below. Other features, aspects, and advantages of morphing a control object into another control object control will become apparent from the description, the drawings, and the claims.

BRIEF DESCRIPTION OF THE DRAWINGS

Like reference symbols in the various drawings indicate like elements.

DETAILED DESCRIPTION

Exemplary Morphing of a Control Object

Figure 1:
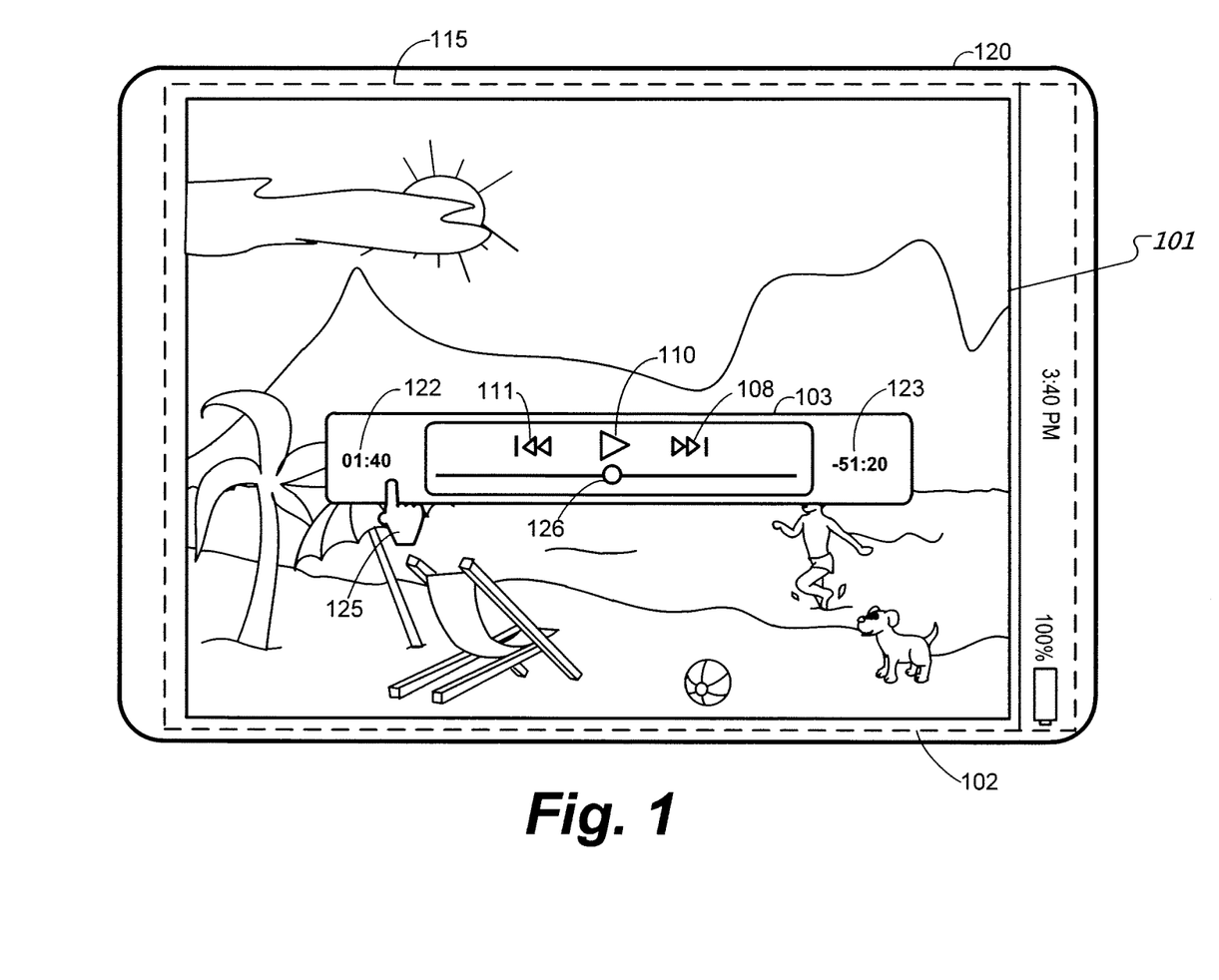
FIG. 1 illustrates an exemplary control object presented in a user-interface.

FIG. 1 illustrates an exemplary control object 110 presented in a user-interface 115. The user interface 115 is shown displayed on a display device 120.

The display device 120 can be coupled to or integrated with a computing device (not shown), such as a personal computer, electronic tablet, electronic book reader, cellular phone, PDA, gaming device or any other computing device that can present media content. In some implementations, the computing device can include a pointing device for manipulating pointer 125. The pointing device, for example, can include a mouse, and/or a touch sensitive display or surface (e.g., surface 102 of the display device 120 or a touchpad) that is responsive to touch input or gestures by one or more fingers or another source of input, e.g., a stylus.

In the example shown in FIG. 1, frame 101 of the media presentation is displayed in user-interface 115. User interface 115 includes a control panel 103 for controlling the media presentation. Control panel 103 can appear in response to interaction from pointer 125 with frame 101. Control panel 103 can include control objects in the form of a timeline scrubber 126 (e.g., a slider control) for adjusting a location of playback of the media presentation based on a location of slider 126 control, a forward control object 108 (e.g., a button) for advancing the media presentation such as to a next scene or page in the media presentation, a back control object 111 (e.g., a button) for navigating backwards in a presentation such as to a previous scene or page, and a play/pause control object 110 (e.g., a button) that can be toggled for playing and pausing the media presentation. Also, an elapsed time 122 and time remaining 123 of the media presentation can be shown in control panel 103. The control panel can also include other controls such as a volume control.

FIGS. 2A-2D illustrate an animation of control object 110 into a second control object 150. The animation can be over a period of time of sufficient duration to create a "morphing" effect, where control object 110 appears to "morph" into, and at least temporarily replace, control object 150. The "morphing" of control object 110 can be initiated in response to user input indicating user interaction with control object 110. In the example shown, control object 110 is a play/pause button and control object 150 is a jog shuttle control for control a rate of playback. In alternative examples, control object 150 can be a jog control for controlling a relatively slow rate of playback such as playback speeds slower than normal playback (i.e in the range of {−1 to 0 to 1} times normal playback speed). In some examples, control object can be a shuttle control, which includes playback speeds faster than normal playback speeds (i.e. less than −1 and greater than 1+). A jog shuttle control allows for both quickly advancing or rewinding through a presentation and for advancing or rewinding through a presentation with finer granularity.

Figure 2A:
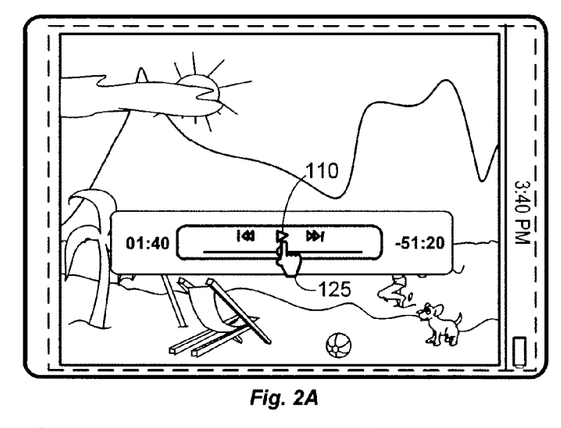
FIGS. 2A-2D illustrate an animation of control object morphing into a second control object.

The user input for interacting with control object 110 to initiate morphing can be different from the user input for selecting control object 110 to toggle between play and pause. For example, the user input to select control object 110 can be a press-and-release with pointer 125. To initiate morphing, however, pointer 125 can be moved over control object 110; as pointer 125 is pressed and before being released, control object 110 can begin to morph from a play button flush with control panel 103 into a 3-dimensional play button, appearing to rise up from control panel 103. As pointer 125 continues to be pressed and not released, control object 110 can continue to morph in an animated fashion, and control objects in control panel 103 can begin to disappear.

Figure 2B:
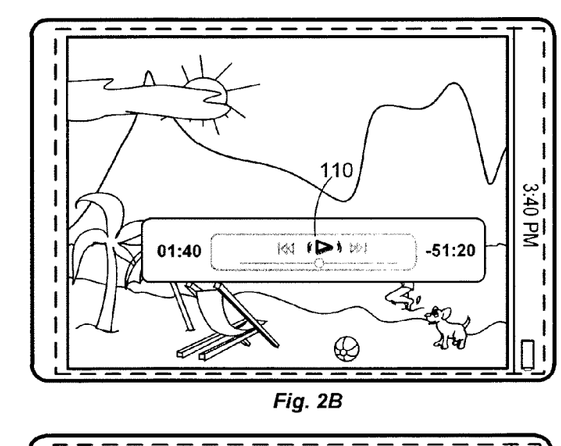

In FIG. 2B, control object 110 expands in an animated fashion as location slider 126, forward control object 108, and back control object 111 begin to disappear, leaving elapsed time 122, time remaining 123, and the morphing control object 110.

Figure 2C:
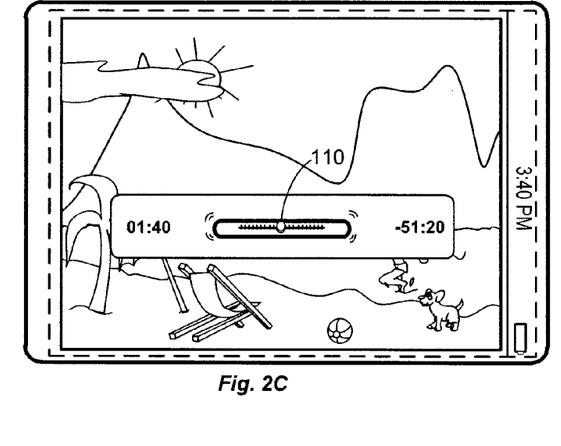

FIG. 2C shows control object 110 continuing to expand and form into a slide rail.

Figure 2D:
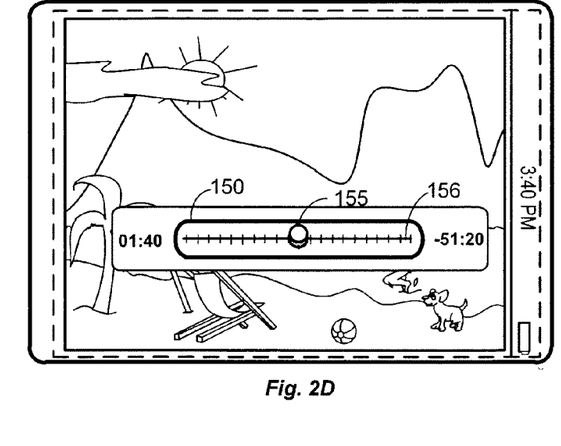

FIG. 2D shows control object 110 having completely morphed into a second control object 150. By initiating morphing of control object 110 before the user releases the press-and-hold to select control object 110, a user is provided a visual cue that by pressing-and-holding (without releasing) a different or new functionality is provided in the user interface 115.

Figure 3:
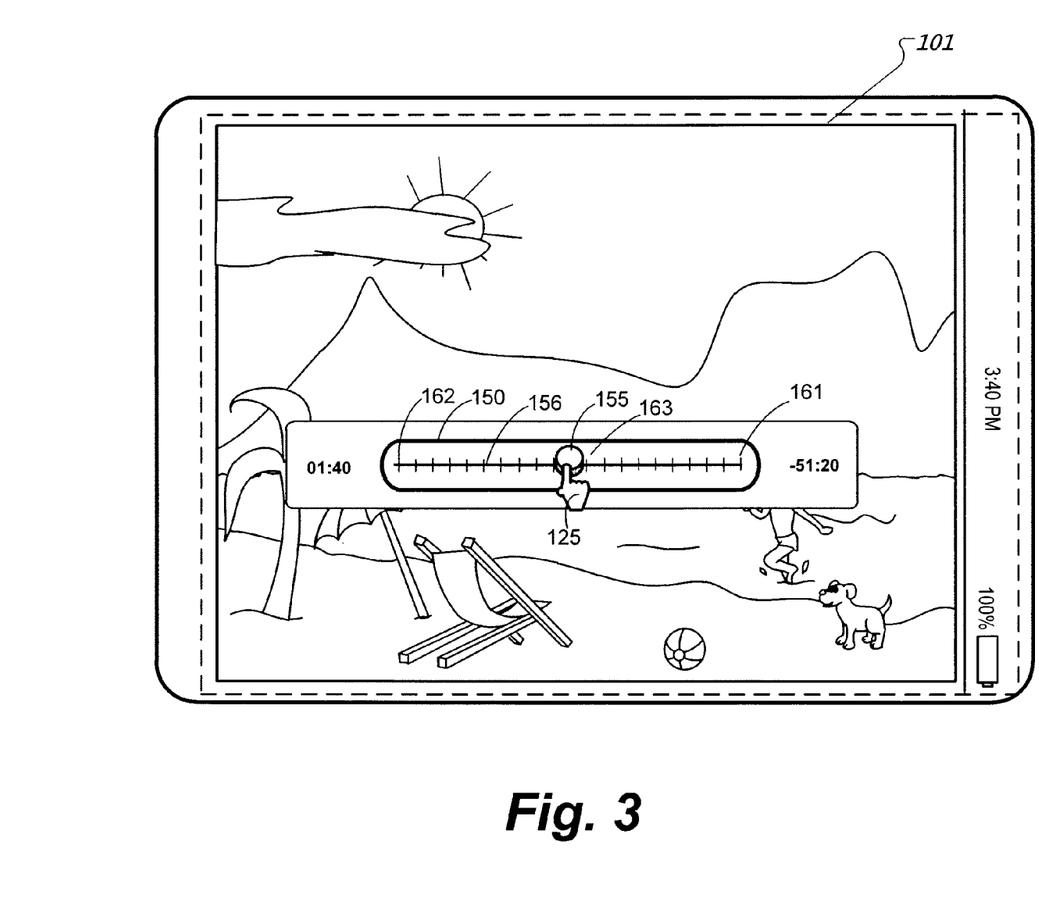
FIG. 3 shows a second control object.

FIG. 3 shows second control object 150. Second control object 150 has a slider 155 that slides along a slide rail 156. Second control object 150 is for controlling a parameter of the presentation different from the parameter controlled by control object 110. In some alternative implementations, the second control object can control the same parameter as the first control object but the method and or type of input can be different, such as to provide for finer granularity of control than is provided with the first control object 150.

Slider 155 and slide rail 156, in FIG. 3, are a jog shuttle control for controlling a rate at which the media presentation is played back (i.e. navigating forward or backward through the presentation). Slide rail 156 has a right end 161, a left end 162, and a neutral position 163 (at center). Second control object 150 can be manipulated to change a value of second control object 150 using a second user input to move slider 155 along slide rail 156 either toward right end 161 or toward left end 162. The location of slider 155 along slide rail 156 determines a rate at which the media presentation is played back.

FIGS. 4A-4D show a value of control object 150 being adjusted based on user input. When slider 155 is at neutral position at 163, the media presentation plays at a rate of zero frames per second (i.e. stopped). As slider 155 is moved from neutral position 163 toward the right end 161 by a user moving pointer 125, the presentation is played forward at a rate defined by the slider's location along slider rail 156. The rate increases the closer slider 155 is moved to right end 161. The rate at which the media presentation is played can be according to a predefined scale (e.g. a curve or linear function) that is a function of the location of slider 155.

Figure 4A:
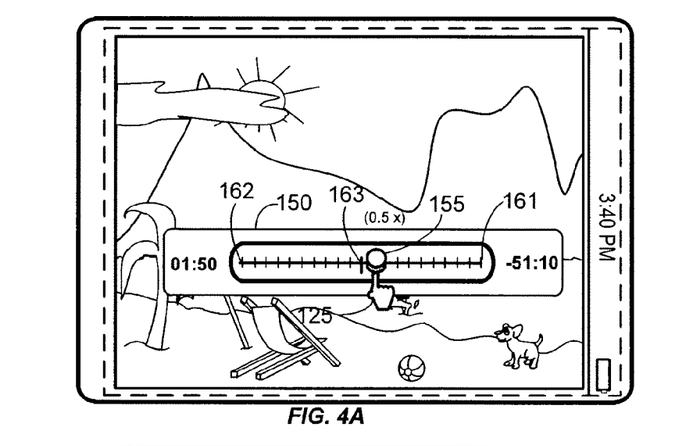
FIGS. 4A-4D show a value of a control object being adjusted based on user input.
Figure 4B:
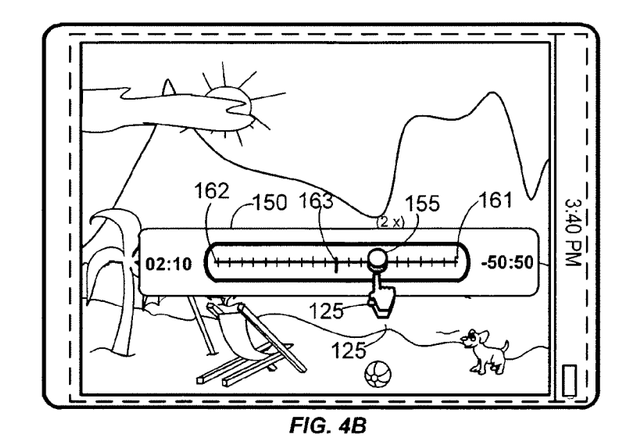
Figure 4C:
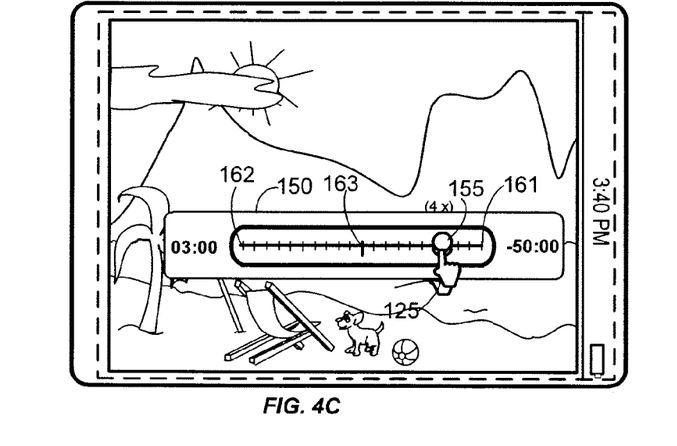
Figure 4D:
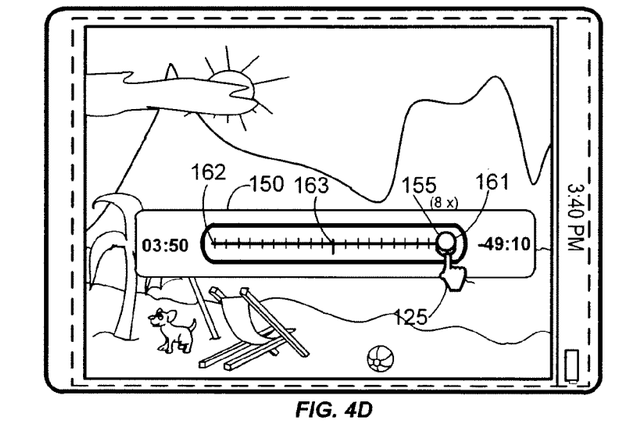

For example, as shown in FIG. 4a, slider 155 is at a first location, just right of neutral position 163. In FIG. 4a, the media presentation forwards slowly at a rate of half the normal playing speed. This allows a user to locate accurately a position in the presentation. In FIG. 4b, slider 155 has been moved to a second location further toward right end 161. In the second location, slider 155 forwards at a rate of two times the normal playing speed. In FIG. 4C, slider 155 has been moved even further toward right end 161 to a third location. As a result, the media presentation forwards at a rate of 4 times the normal playing speed. In FIG. 4d, slider 155 has been moved all the way to right end 161; as a result, the presentation forwards at 8 times the normal playing speed. In like manner, as slider 155 moves from neutral position 163 towards left end 162, the rate at which media presentation rewinds increases. As the media presentation rewinds (or forwards), elapsed time 122 and time remaining 123 update to reflect the frame being displayed.

Continuing with the example discussed above in connection with FIGS. 2A-2D, the user provides a second input to adjust a value of the second control object 150 by moving pointer 125 linearly along slide rail 156 either to the right or to the left. The second input can be received while the interaction input, a press-an-hold, is still received. In some implementations, when a third input is received such as a release of the press-and-hold, slider 155 snaps back to neutral position 155 and playing stops (or e.g. resumes normal playback). To readjust a playback rate, pointer 125 is moved to a location along slide rail 156 when a press-and-hold input is received. Slider 155 jumps to a location on slide rail 156 corresponding to the press-and-hold, and the presentation plays back at a rate according to the location. Again, if pointer 125 is moved either to the left or to right while the press-and-hold is still being received, slider 155 will follow and the playback rate will change accordingly.

Figure 5:
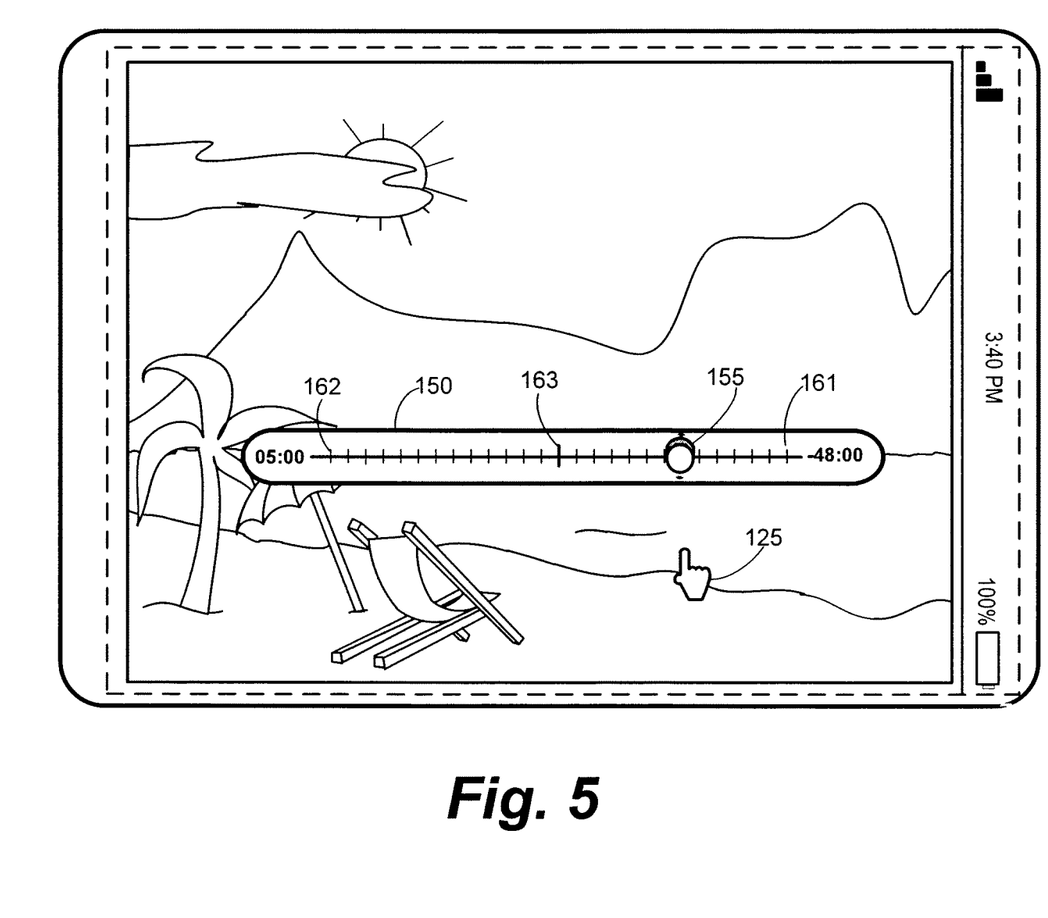
FIG. 5 shows an example locking input.

FIG. 5 shows locking a value of second control object 150. When a user decides upon a playback rate at a location along slide rail 156 as shown in FIG. 5, the playback rate is locked into place upon receiving a fourth-input so that the user can terminate the second input (e.g. the press-and-hold along a dimension of slide rail 156) without changing the playback rate. For example, to lock slider 155 and slide rail 156 into place so that the presentation continues to plays back at a selected rate even when the second input is released, pointer 125 is swiped downward. To unlock slider 155, a fifth input can be received. For example, a swipe-up with pointer 125 can cause slider 155 to unlock. Upon being unlocked, slider 155 snaps back to neutral position 163.

In some implementations, when a user has finished using control object 150, an input can be received to cause second control object 150 to morph back into control object 110. In some implementations, if a predetermined amount of time lapses without receiving input using pointer 125, second control object 150 can disappear. When the user wants to control the presentation again using second control object 150, the user can move pointer 125 over control panel 103, which causes control panel 103 to appear with control object 110. The user can press-and-hold control object 110 to cause the control object 110 to morph into second control object 150.

In some implementations, when the interaction input (e.g. the press-and-hold) is released, second control object 150 morphs back into control object 110. For example, if a user releases the press-and-hold (e.g. mouse-up), control object 150 morphs back into control object 110. In such an implementation, control object 150 remains displayed only while the user maintains mouse down (i.e., button down), or in the example of touch input, while the user keeps touching second control object 150. In such an example, while the interaction is being received, a locking input can be received to lock second control object 150 into place such that it does not automatically morph back into control object 110 upon the interaction input being terminated. Another input can be received to unlock second control object 150, causing second control object 150 to automatically morph back into first control object 110.

In some implementations, input can be provided using a touch screen interface instead of using pointer 125. In such an embodiment, a user can interact directly with control object 110 presented in the user-interface 115. For example, to cause panel 103 to appear, user can touch, surface 102 in a location associated with the control pane. To cause control object 110 to morph into second control object 150, the user can continue to press-and-hold on control object 110 with a finger (or a stylus) for a predetermined amount of time. After the predetermined amount of time passes, control object 110 morphs into control object 150. The user can adjust the value of a rate of playback by moving the user's finger along slide rail 156. Slider 155 follows the user's finger, and the rate of playback is changed accordingly. If the finger is removed from surface 102, slider 155 snaps back to neutral position 163 and playback stops (or returns to a normal playback rate). To cause second control object 150 to morph back into the control object 110, another input can be received such as a tap on surface 102 in a location off of second control object 150 or a time-out event. In some examples, a tap on surface 102 on a location off of second control object 150 can cause second control object 150 to disappear. In some examples, termination of the interaction input (e.g. press-and-hold), such as removal of the finger from the surface 102, can cause the playback to stop (or return to a neutral rate) and can cause second control object 150 to disappear or to morph back into control object 110. This allows a user to quickly and accurately find a location in a presentation by adjusting a rate of playback of a presentation. Once a desired location is found, the user can quickly move back to the play/pause button.

FIG. 5 shows an example locking input. In some implementations, a locking input, such as a gesture in the form of a three-finger swipe down user interface 115, can lock slider 155 into place and thus locking a selected playback rate. Another gesture, such as a three-finger swipe upward can unlock slider 155. By locking slider 155 into place, the second control object 150 does not automatically morph pack into control object 110. A visual cue can accompany the locking of slider 155 into place. For example, in response to the three-finger swipe down, an animation showing the slider 155 tilting downward can be presented. Upon receiving a gesture to unlock slider 155, visual cue can be removed, such as tilting slide 155 back up. By providing a visual cue in the form of an animation to lock (and unlock) slider 155 into place, a user can visually see the results of the locking and unlocking gestures. This can help a user know the lock status of slider 155. This can also help a user discover the results of such gestures by providing a visual indication of the change of status of slider 155.

In some embodiments, the morphing of control object 110 can occur in response to other types of input indicating interaction with control object 110. For example, instead of a press-and-hold, the input shown in FIG. 2A to initiate morphing can include a hover-over. The hover-over includes hovering over control object 110 with pointer 125. After pointer 125 remains over control object 110 for a predetermined amount of time, control object 110 begins to morph as shown in FIGS. 2A-2D. As long as pointer 125 remains over the second control object 150, second control object 150 will remain displayed and can be manipulated. When pointer 125 is moved off of second control object 150, the second control object morphs back into control object 110. In some examples, when pointer 125 is moved off of second control object 150, second control object disappears. To use second control object 150 again, control object 110 can be morphed into second control object 150 using a hover over. The above described functionality allows a user to quickly access a control such as a jog shuttle control for adjusting a playback rate of a presentation to locate a position within the presentation with a high degree of accuracy; once a desired location is found, the user can quickly return to the presentation without needing input multiple different commands.

In such an embodiment, to adjust a value of control object 150, pointer 125 is moved over a location on slider control 156 and a press-and-hold is received. The presentation begins playing back the presentation at a rate based on the location. As long as a press-and-hold is received, the control object 150 will continue to be displayed and the playback rate can be adjusted. To adjust the playback rate, pointer 125 is moved along slider control 156 while the press-and-hold is being received. If the press-and-hold is released, slider 125 will snap back to neutral position 163.

In various of the examples described above, a first control object in the form of a toggle control for play/pause is morphed into a second control object in the form of a slider control and slider for adjusting a rate of playback. In some implementations, various types of control objects can be morphed into various other control objects. For example, a first control object can be morphed into a round jog shuttle control. In some examples, a volume control can be morphed into a pitch control.

Exemplary Process

Figure 6:
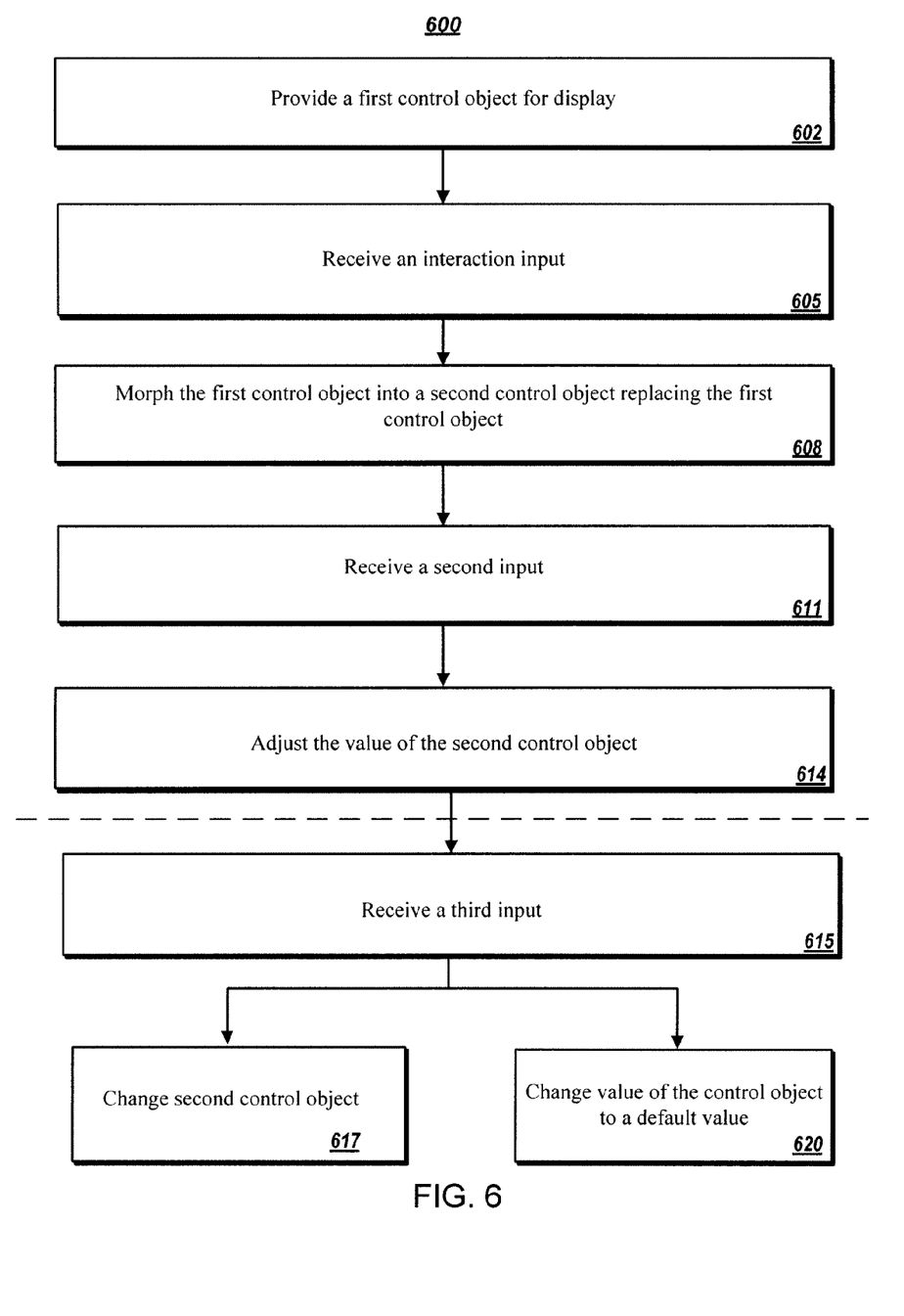
FIG. 6 is an exemplary process flow for morphing a control object.

FIG. 6 is an exemplary process flow 600 for morphing a first control object into a second control object. Process 600 can be used to implement morphing of a control object on a system architecture, as described in reference to FIG. 8.

In some implementations, process 600 can begin by providing a first control object for display on a graphical user interface (602). The first control object can be any control object that can control one or more parameters of a system, device or application in response to a first input. An example application is a media application for presenting a presentation of media content. In some examples, the first control object can include a toggle button that can be selected by a user to toggle between play and pause. Other exemplary parameters that can be controlled with the first control object include volume, fast forward, rewind, etc.

An interaction input is received indicating a user interaction with the control object (605). The interaction input is of a type different from the first input. For example, the first input can be a press-and-release of the first control object to select the control object whereas the interaction input can be a press-and-hold (without release) at a location corresponding to the first control object. In response to the interaction input, the first control object is morphed into a second control object replacing the first control object (608). For example, a toggle button can be morphed into a slider rail with a slider, such as morphing a play/pause control into a linear jog shuttle control.

A second input is received indicating an intention of the user to change a value of the control object (611). For example, the second input can be a movement along a dimension of the second control object as described in reference to FIGS. 4A-4D. The second value can be determined according to a location of the input received along the dimension of the first control object. The value of the second control object is adjusted according to the second input (614). For example, the second value can include a rate of playing back a media presentation. The media presentation can be played back at a rate set by the second value. Also, the second input can be different from the first input. For example, the first input can be in the form of a press-and-release for selecting a toggle button such as a play/pause button whereas the second input can be a movement of a pointer or touch input along a dimension of the second control object.

In some implementations, a third input can be received (615). The third input can cause the second control object to change (617) such as to morph back into the first control object or to disappear altogether. The third-input can be for example an input triggered by a time-out in response to no input being received from the user. In some examples, the third-input can include input, such as a click or a tap, in an area other than in a location associated with the second control object. In some examples, the third-input can include termination of the second input. For example, in response to the second input being terminated, such as the input along a dimension of the second object being terminated, the second control object can morph back into the first control object.

Also, in some examples, in response to receiving the third input, the adjusted second value can be changed to a default value (620). For example, where the adjusted value represents a rate of playback of a media presentation, when a user releases a press-and-hold indicating a termination of the second input being received along a dimension of the second control object, the adjusted value can return to a default rate, such as a rate of zero times the normal playback rate (i.e. stopped) or a rate of one times the normal playback rate (i.e. the normal playback rate).

Figure 7:
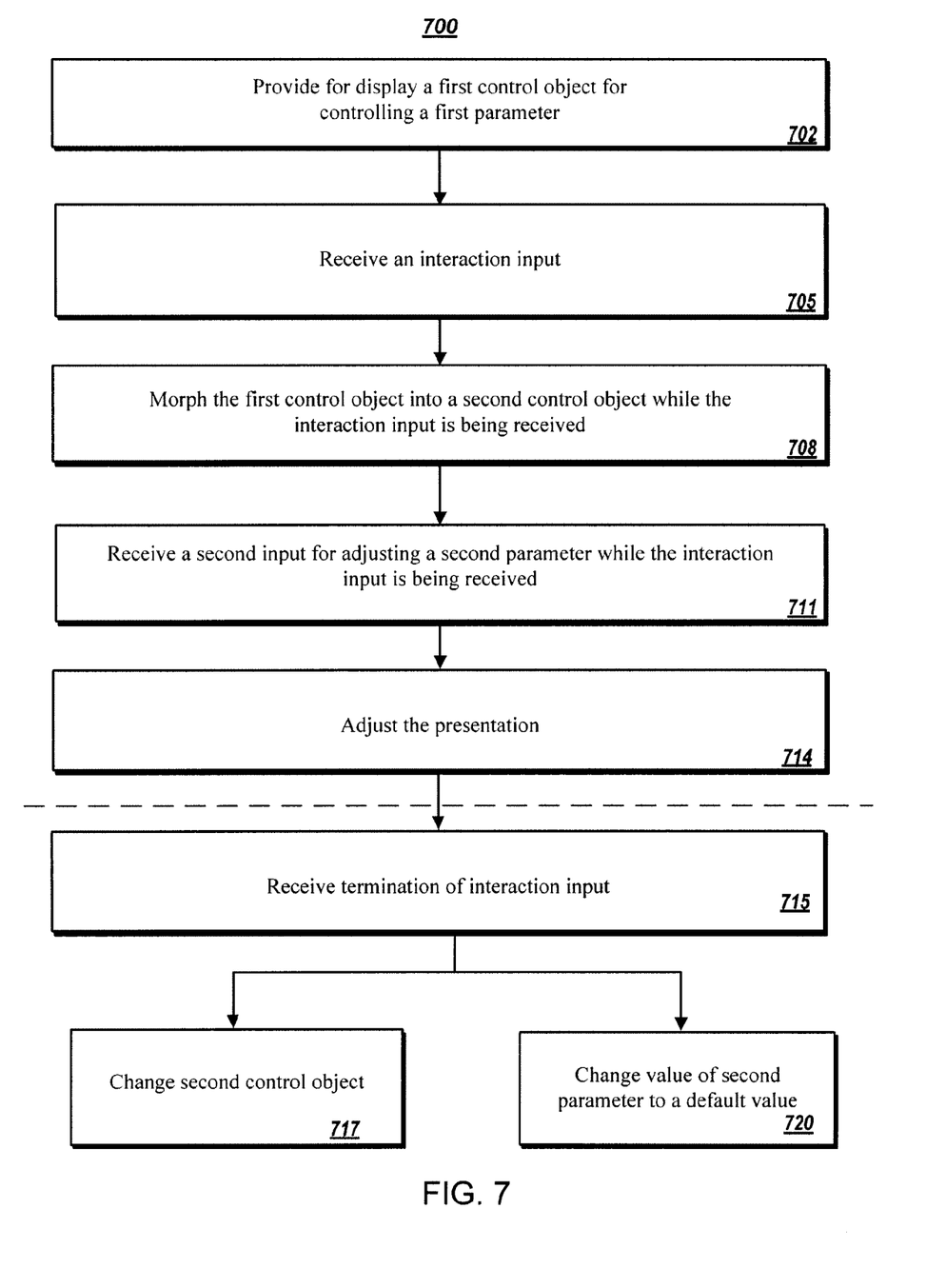
FIG. 7 is an exemplary process flow for morphing a control object.

FIG. 7 is an exemplary process flow 700 for morphing a first control object into a second control object. Process 700 can be used to implement morphing of a control object on a system architecture, as described in reference to FIG. 8.

According to process 700, a first control object is provided for display on a graphical user interface (702). The control object can be any control object that can control a first parameter of a system, device or application in response to a first input, such as a toggle button that can be selected by a user to toggle between play and pause. An interaction input is received indicating a user interaction with the first control object (705). The interaction input can include, for example, a press-and-hold of the first control object using a pointer or a touch-screen input. Another interaction input can include a hover-over of first control object. In response to the interaction input, the first control object is morphed into a second control object while the interaction input is being received (708), second control object 150 replacing control object 110. The second control object is configured to provide control of a second parameter, the second parameter different from the first parameter. For example, while a press-and-hold or a hover-over is being received, a toggle button can be morphed into a slider rail with a slider. The slider rail and the slider are configured to provide control over the second parameter, such as a rate of playback.

Also, while the interaction input is being received, a second input for adjusting a value of a second parameter is received (711). For example, while a press-and-hold is being received, the second input, such as a movement along a dimension of the second control object as described in reference to FIGS. 4A-4D, is received without releasing the press-and-hold. In some examples, where the first input is a hover-over of the second control object using a pointer, the second input can be received while such hover-over event is maintained over the second control object. The value of the second parameter can be determined according to a location of the second input. The value of the second parameter is adjusted according to the second input (714). For example, the value of the second parameter can include a rate of playback of a media presentation. The media presentation can be played according to the value of the second parameter.

In some optional embodiments, a termination of the interaction input can be received such as the press-and-hold being released (715). When the interaction input is terminated, the second control object can change (717). For example, when the interaction input is terminated, the second control object can morph back into the first control object. Where the interaction input is a press-and-hold, the press-and-hold can be released and thereby causing the second control object to morph back into the first control object. Releasing a press-and-hold can include, releasing a click-and-hold on a mouse, and can include termination of a touch input when, e.g., a finger is removed from the second control object displayed in the user-interface. Where the second input is a hover-over, the second control object can morph back into the first control object when the hover-over event terminates, e.g. a pointer is moved off of the second control object.

In some examples, when the interaction input is terminated (715), the second control object can be removed from the user interface (717) without presenting the first control object. For example, where the interaction input is a press-and-hold, the press-and-hold can be released and thereby causing the second control object to disappear from the user-interface. Where the second input is a hover-over, the second control object can disappear when the hover-over event terminates, e.g. when a pointer is moved off of the second control object. The user can access the first control object again and use the interaction input to morph the first control object into the second control object again.

In some examples, upon receiving termination of the interaction input, the value of the second parameter can be changed to a default value (720). For example, where the second parameter represents a rate of playback of a media presentation, when a user releases a press-and-hold indicating a termination of the interaction input, the value of the second parameter can return to a default rate.

Exemplary System Architecture

Figure 8:
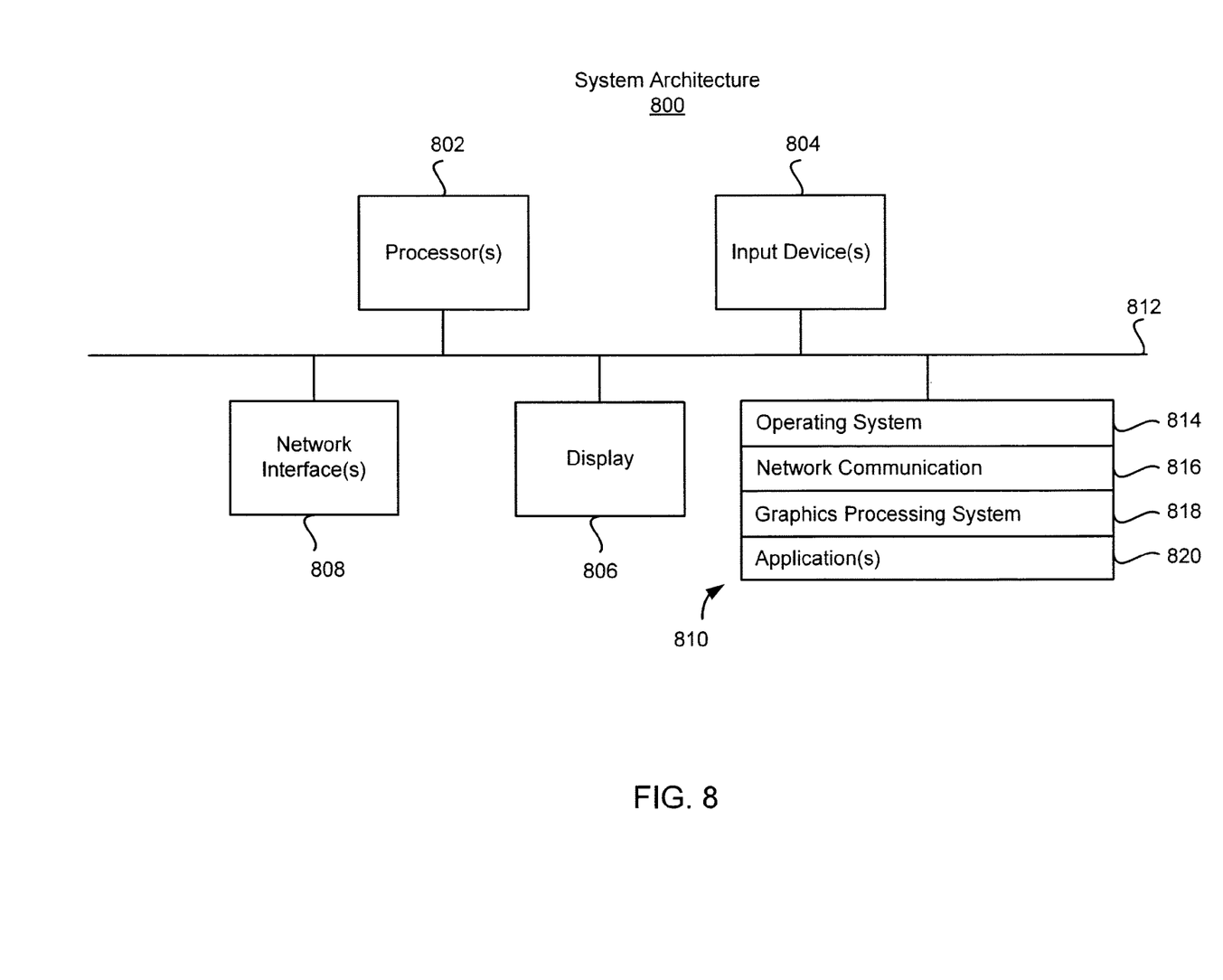
FIG. 8 is a block diagram of an exemplary system architecture implementing morphing of a control object according to FIGS. 1-7.

FIG. 8 is a block diagram of an exemplary system architecture implementing morphing of a first control object into a second control object according to FIGS. 1-7. The architecture 800 can be implemented on any electronic device that runs software applications derived from compiled instructions, including without limitation personal computers, servers, smart phones, media players, electronic tablets, game consoles, email devices, etc. In some implementations, the architecture 800 can include one or more processors 802, one or more input devices 804, one or more display devices 806, one or more network interfaces 808, and one or more computer-readable mediums 810. Each of these components can be coupled by bus 812.

Display device 806 can be any known display technology, including but not limited to display devices using Liquid Crystal Display (LCD) or Light Emitting Diode (LED) technology. Processor(s) 802 can use any known processor technology, including but are not limited to graphics processors and multi-core processors. Input device 804 can be any known input device technology, including but not limited to a keyboard (including a virtual keyboard), mouse, track ball, and touch-sensitive pad or display. Bus 812 can be any known internal or external bus technology, including but not limited to ISA, EISA, PCI, PCI Express, NuBus, USB, Serial ATA or FireWire. Computer-readable medium 810 can be any medium that participates in providing instructions to processor(s) 802 for execution, including without limitation, nonvolatile storage media (e.g., optical disks, magnetic disks, flash drives, etc.) or volatile media (e.g., SDRAM, ROM, etc.).

Computer-readable medium 810 can include various instructions 814 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 804; sending output to display device 806; keeping track of files and directories on computer-readable medium 810; controlling peripheral devices (e.g., disk drives, printers, etc.) which can be controlled directly or through an I/O controller; and managing traffic on bus 812. Network communications instructions 816 can establish and maintain network connections (e.g., software for implementing communication protocols, such as TCP/IP, HTTP, Ethernet, etc.).

A graphics processing system 818 can include instructions that provide graphics capabilities. For example, the graphics processing system 818 can provide morphing of a first control object into a second control object on a display on a graphical user interface of display 806, as described with reference to FIGS. 1-7.

Application(s) 820 can be any application that uses the first and/or second control object, such as a media application. Instructions for generating the first and/or second control object can be included in the application, the operating system and/or provided as a plug-in to the application (e.g., an Media Unit plug-in).

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A computer-implemented method, comprising:
  causing a plurality of control objects, including a first control object and a second control object, to be displayed on a graphical user interface presented on a display of a device;
  receiving an interaction input indicating a user interaction with the first control object; and
  in response to the interaction input:

in accordance with a determination that the interaction input is a first input, controlling a first parameter of the presentation of the media content based on the first input;

in accordance with a determination that the interaction input is a second input:
- upon detecting a first portion of the interaction input, replacing the second control object with a slider control object such that the second control object is no longer visible;
- upon detecting a second portion of the interaction input, adjusting a second parameter of the presentation of the media content in accordance with movement corresponding to the second portion of the interaction input; and
- upon detecting a third portion of the interaction input, replacing the slider control object with the second control object such that the slider control object is no longer visible.

2. The method of claim 1, wherein the interaction input comprises a press-and-hold.

3. The method of claim 1, wherein the second portion of the interaction input indicates an intention of the user to change a value of the slider control object, and the method further comprising:
adjusting the value of the slider control object according to the second portion of the interaction input.

4. The method of claim 3,
wherein the value of the slider control object comprises a rate of playback of the presentation;
wherein the slider control object comprises a slider and a slide rail for adjusting the value of the slider control object; and
wherein the value of the slider control object is determined by a location of the slider along a dimension of the slide rail.

5. The method of claim 4, wherein the first control object is a toggle button for toggling between play and pause.

6. The method of claim 4, wherein the second control object includes a content slider configured to control a playback position for the media content.

7. The method of claim 6, wherein the slider control object that replaces the second control object includes a playback speed slider configured to control a playback speed for the media content.

8. The method of claim 3, wherein the second input comprises a type different from the first input.

9. The method of claim 3 further comprising adjusting the value of the slider control object to a default value in response to detecting the third portion of the interaction input.

10. The method of claim 1, further comprising, while the interaction input is being received,
adjusting the presentation according to the second parameter.

11. The method of claim 10,
wherein the slider control object is a jog shuttle control for controlling a rate of playback; and
wherein receiving the second portion of the interaction input comprises receiving input associated with the jog shuttle control.

12. The method of claim 1, wherein the interaction input comprises a press-and-hold in a location associated with the first control object.

13. The method of claim 1, wherein the interaction input comprises a hover-over with a pointer of a location associated with the first control object.

14. The method of claim 1,
wherein a value of the second parameter is configured to change to a default value in response to a termination of the interaction input; and
further comprising:
receiving an additional input while the interaction input is being received, and
locking the value of the slider control object in response to the additional input such that upon termination of the interaction input, the value of the slider control object remains unchanged.

15. The method of claim 14, further comprising providing a visual cue indicating the locking of the value of the slider control object.

16. The method of claim 1, the first portion of the interaction input includes initiation of touch input, the second portion of the interaction input includes continued contact of the touch input before liftoff, and the third portion of the interaction input includes liftoff of the touch input.

17. The method of claim 1, further comprising:
causing a representation of media content to be displayed in the graphical user interface, wherein the plurality of control objects are caused to be displayed in the graphical user interface while the representation of the media content is displayed in the graphical user interface;
wherein the interaction input is received while maintaining display of the representation of the media content in the graphical user interface, and the second control object is replaced with a slider control object while maintaining display of the representation of the media content.

18. The method of claim 1, further comprising:
upon detecting the first portion of the interaction input, ceasing to display the plurality of control objects in the graphical user interface.

19. A computer-readable, non-transitory storage medium storing instructions, which, when executed by a processor, causes the processor to perform operations comprising:
causing a plurality of control objects, including a first control object and a second control object, to be displayed on a graphical user interface presented on a display of a device;
receiving an interaction input indicating a user interaction with the first control object; and
in response to the interaction input:
in accordance with a determination that the interaction input is a first input, controlling a first parameter of the presentation of the media content based on the first input;
in accordance with a determination that the interaction input is a second input:
- upon detecting a first portion of the interaction input, replacing the second control object with a slider control object such that the second control object is no longer visible;
- upon detecting a second portion of the interaction input, adjusting a second parameter of the presentation of the media content in accordance with movement corresponding to the second portion of the interaction input; and
- upon detecting a third portion of the interaction input, replacing the slider control object with the second control object such that the slider control object is no longer visible.

20. The medium of claim 19, wherein the interaction input comprises a press-and-hold.

21. The medium of claim 19, wherein the second portion of the interaction input indicates an intention of the user to change a value of the slider control object, and the operations further comprising:
    adjusting the value of the slider control object according to the second portion of the interaction input.

22. The medium of claim 19,
    wherein the value of the slider control object comprises a rate of playback of the presentation;
    wherein the slider control object comprises a slider and a slide rail for adjusting the value of the slider control object; and
    wherein the value of the slider control object is determined by a location of the slider along a dimension of the slide rail.

23. The medium of claim 19,
    adjusting the presentation according to the second parameter.

24. The medium of claim 23,
    wherein the slider control object is a jog shuttle control for controlling a rate of playback; and
    wherein receiving the second portion of the interaction input comprises receiving input associated with the jog shuttle control.

25. The medium of claim 19,
    wherein a value of the second parameter is configured to change to a default value in response to a termination of the interaction input; and
    the operations further comprising:
        receiving an additional input while the interaction input is being received, and
        locking the value of the slider control object in response to the additional input such that upon termination of the interaction input the value of the slider control object remains unchanged.

* * * * *